US007619647B2

(12) United States Patent
Wren et al.

(10) Patent No.: US 7,619,647 B2
(45) Date of Patent: Nov. 17, 2009

(54) CONTEXT AWARE SURVEILLANCE SYSTEM USING A HYBRID SENSOR NETWORK

(75) Inventors: Christopher R. Wren, Arlington, MA (US); Ugur M. Erdem, Melrose, MA (US); Ali J. Azarbayejani, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1035 days.

(21) Appl. No.: 11/110,528

(22) Filed: Apr. 20, 2005

(65) Prior Publication Data

US 2006/0238618 A1 Oct. 26, 2006

(51) Int. Cl.
*H04N 7/18* (2006.01)

(52) U.S. Cl. ........................................ 348/143; 348/159

(58) Field of Classification Search ............. 348/36–39, 348/142–170
See application file for complete search history.

(56) References Cited

U.S. PATENT DOCUMENTS 4,857,912 A * 8/1989 Everett et al. ............... 340/508
5,091,780 A * 2/1992 Pomerleau .................. 348/152
5,359,363 A * 10/1994 Kuban et al. ................... 348/36
6,697,103 B1 * 2/2004 Fernandez et al. .......... 348/143
6,698,021 B1 * 2/2004 Amini et al. ................ 725/105

OTHER PUBLICATIONS

Patrick Baker and Yiannis Aloimonos. Calibration of a multicamera network. In Robert Pless, Jose Santos-Victor, and Yasushi Yagi, editors, The fourth Workshop on Omnidirectional Vision, Camera Networks and Nonclassical cameras, Madison, Wisconsin, USA, 2003.
J. Barreto and K. Daniilidis. Wide area multiple camera calibration and estimation of radial distortion. In Peter Sturm, Tomas Svoboda, and Seth Teller, editors, The fifth Workshop on Omnidirectional Vision, Camera Networks and Non-classical cameras, Prague, 2004.
Robert T. Collins and Yanghai Tsin. Calibration of an outdoor active camera system. In Computer Vision and Pattern Recognition, pp. 528-534, Fort Collins, CO, USA, Jun. 1999. IEEE.
Richard I. Hartley. Self-calibration from multiple views with a rotating camera. In The Third European Conference on Computer Vision, pp. 471-478, Stockholm, Sweden, 1994. Springer-Verlag.
Leslie Pack Kaelbling, Michael L. Littman, and Andrew W. Moore. Reinforcement learning: A survey. Journal of Artificial Intelligence Research, 4:237-285, 1996.

(Continued)

*Primary Examiner*—Andy S Rao
(74) *Attorney, Agent, or Firm*—Dirk Brinkman; Gene Vinokur

(57) ABSTRACT

A surveillance system detects events in an environment. The system includes a camera arranged in the environment, and multiple context sensors arranged in the environment. The sensors are configured to detect events in the environment. A processor is coupled to the camera and the context sensors via a network. The processor provides the camera with actions based only on the events detected by the context sensors. The actions cause the camera to view the detected events.

10 Claims, 2 Drawing Sheets

OTHER PUBLICATIONS

S. Khan, O. Javed, and M. Shah. Tracking in uncalibrated cameras with overlapping field of view. In Workshop on Performance Evaluation of Tracking and Surveillance. IEEE, 2001.
Ali Rahimi, Brian Dunagan, and Trevor Darrell. Simultaneous calibration and tracking with a network of non-overlapping sensors. In Vision and Pattern Recognition, pp. 187-194. IEEE Computer Society, Jun. 2004.
S.N. Sinha and M. Pollefeys. Towards calibrating a pan-tilt-zoom cameras network. In Peter Sturm, Tomas Svoboda, and Seth Teller, editors, The fifth Workshop on Omnidirectional Vision, Camera Networks and Non-classical cameras, Prague, 2004.
Gideon P. Stein. Tracking from multiple view points: Self-calibration of space and time. In Image Understanding Workshop, Montery, CA, USA, 1998. Darpa.
M. M. Trivedi, A. Prati, and G. Kogut. Distributed interactive video arrays for event based analysis of incidents. In International Conference on Intelligent Transportation Systems, pp. 950-956, Singapore, Sep. 2002. IEEE.
Christopher R. Wren and Srinivasa G. Rao. Self-configuring, lightweight sensor networks for ubiquitous computing. In The Fifth International Conference on Ubiquitous Computing: Adjunct Proceedings, Oct. 2003. also MERL Technical Report TR2003-24.
Christopher Wren, Ali Azarbayejani, Trevor Darrell, and Alex Pentland. "Pfinder: Real-time tracking of the human body".IEEE Trans. Pattern Analysis and Machine Intelligence, 19(7):780-785, Jul. 1997.
Chris Stauffer and W.E.L. Grimson. "Adaptive background mixture models for real-time tracking". In Computer Vision and Pattern Recognition, vol. 2, Fort Collins, Colorado, Jun. 1999.
Kentaro Toyama, John Krumm, Barry Brumitt, and Brian Meyers, "Wallflower: Principles and Practice of Background Maintenance" IEEE International Conference on Computer Vision, 1999.

* cited by examiner

100

200

CONTEXT AWARE SURVEILLANCE SYSTEM USING A HYBRID SENSOR NETWORK

FIELD OF THE INVENTION

This invention relates generally to sensor networks, and more particularly to a-hybrid network of cameras and motion sensors in a surveillance system.

BACKGROUND OF THE INVENTION

There is an increasing need to provide security, efficiency, comfort, and safety for users of environments, such as buildings. Typically, this is done with sensors. When monitoring an environment with sensors, it is important to have a measure of a global context of the environment to make decisions about how best to deploy limited resources. This global context is important because decisions made based on single sensors, e.g., a single cameras, are necessarily made with incomplete data. Therefore, the decisions are unlikely to be optimal. However, it is difficult to recover the global context using conventional sensors due to equipment cost, installation cost, and privacy concerns.

Some of the sensors can be relatively simple, e.g., motion detectors. Motion detectors can occasionally signal an unusual event with a single bit. Bits from multiple sensors can indicate temporal relationships between the events. Other sensors are more complex. For example, pan-tilt-zoom (PTZ) cameras generate a continuous stream of high-fidelity information about an environment at a very high data rate and computational cost to interpret that data. However, it is impractical to completely cover the entire environment with such complex sensors.

Therefore, it makes sense to install a large number of simple sensors, such as motion detectors, and only a smaller number of complex PTZ cameras. However, it is labor intensive to specify the mapping between a large network of simple sensors and the actions that the system needs to make based on that data, particularly, when the placement of the sensors needs to change over time as the physical structure of the environment is reconfigured.

Therefore, it is desired to dynamically acquire action policies given a hybrid sensor network arranged in an environment, activity of users of the environment, and application specific feedback about the appropriateness of the actions.

In particular, it is desired to optimize expensive and limited resources, the attention of a lone security guard, a single monitoring station, network bandwidth of a video recording system, the placement of elevator cabs in a building, or the utilization of energy for heating, cooling, ventilation or lighting.

Without loss of generality, the invention is concerned particularly with a PTZ camera. The PTZ camera enables a surveillance system to acquire high-fidelity video of events in an environment. However, the PTZ camera must be pointed at locations where interesting events occur. Thus, in this example application, the limited resource is orienting the camera.

When the PTZ camera is pointing at empty space, the resource is wasted. Some PTZ cameras can be pointed manually at an interesting event. However, this assumes that the event has already been detected. Other PTZ cameras aimlessly scan the environment in a repetitive pattern, oblivious to events. In either case, resources are wasted.

It is desired to improve the efficiency of limited, expensive resources, such as PTZ cameras. Specifically, it is desired to automatically point the camera at interesting events based on information acquired from simple sensors in a hybrid sensor network.

Conventionally, a geometric survey of the environment is performed with specialized tools, prior to operating a surveillance system. Another method generates a known or an easy to detect pattern of motion, such as having a person or robot navigate an empty environment following a predetermined path. This geometric calibration can then be used to manually construct an ad hoc rule-based surveillance system.

However, those methods severely constrain the system. It is desired to minimize the constraints on the users and in the environment. By enabling unconstrained motion of the users, it becomes possible to adapt the system to a large variety of environments. In addition, it becomes possible to eliminate the need to repeatedly perform geometric surveys, as the physical structure of the environment is reconfigured over time.

System and methods to configure and calibrate a network of PTZ cameras are known, see Robert T. Collins and Yanghai Tsin, "Calibration of an outdoor active camera system," IEEE Computer Vision and Pattern Recognition, pp. 528-534, June 1999; Richard I. Hartley, "Self-calibration from multiple views with a rotating camera," The Third European Conference on Computer Vision, Springer-Verlag, pp. 471-478, 1994; S. N. Sinha and M. Pollefeys, "Towards calibrating a pan-tilt-zoom cameras network," Peter Sturm, Tomas Svoboda, and Seth Teller, editors, Fifth Workshop on Omnidirectional Vision, Camera Networks and Non-classical cameras, 2004; Chris Stauffer and Kinh Tieu, "Automated multi-camera planar tracking correspondence modeling," IEEE Computer Vision and Pattern Recognition, pp. 259-266, July 2003; and Gideon P. Stein, "Tracking from multiple view points: DARPA Self-calibration of space and time," "Image Understanding Workshop," 1998.

This interest has been enhanced by the DARPA video surveillance and monitoring initiative. Most of that work has focused on classical calibration between the cameras and a fixed coordinate system of the environment.

Another method describes how to calibrate cameras with an overlapping field of view, S. Khan, O. Javed, and M. Shah, "Tracking in uncalibrated cameras with overlapping field of view, IEEE Workshop on Performance Evaluation of Tracking and Surveillance, 2001. There, the objective is to find pair-wise camera field of view borders such that target correspondences in different views can be located, and successful inter-camera 'hand-off' can be achieved.

On a more practical side, a camera network with cooperating low and high resolution cameras in a relatively difficult outdoor environment, such as a highway, is described by M. M. Trivedi, A. Prati, and G. Kogut, "Distributed interactive video arrays for event based analysis of incidents," IEEE International Conference on Intelligent Transportation Systems, pp. 950-956, September 2002.

Other methods combine autonomous systems with structured light, J. Barreto and K. Daniilidis, "Wide area multiple camera calibration and estimation of radial distortion," Peter Sturm, Tomas Svoboda, and Seth Teller, editors, Fifth Workshop on Omnidirectional Vision, Camera Networks and Nonclassical cameras, 2004; use calibration widgets, Patrick Baker and Yiannis Aloimonos, "Calibration of a multicamera network," Robert Pless, Jose Santos-Victor, and Yasushi Yagi, editors, Fourth Workshop on Omnidirectional Vision, Camera Networks and Nonclassical cameras, 2003; or use surveyed landmarks, Robert T. Collins and Yanghai Tsin, "Calibration of an outdoor active camera system," IEEE Computer Vision and Pattern Recognition, pp. 528-534, June 1999.

However, most of those methods are impractical because those methods either require too much labor, in the case of calibration tools, or place too many constraints on the environment, in the case of structured light, or require manually surveyed landmarks. In any case, those methods assume that calibration is done prior to operating the system, and make no provision for re-calibrating the system dynamically during operation as the environment is reconfigured.

Those problem are address by Stein and Stauffer et al. They use tracking data to estimate transforms to a common coordinate system for their camera network. They do not distinguish between setup and operational phases. Rather, any tracking data can be used to calibrate, or re-calibrate their system. However, neither of those methods directly addressed the question of PTZ cameras. More importantly, those methods place severe constraints on the sensors used in the network. The sensors acquire very detailed positional data for moving objects, and must also be able to differentiate objects to successfully track the objects. This is true because tracks, and not individual observations, are the basic unit used in their calibration process.

All the methods describe above require the acquisition of a detailed geometric model of the sensor network and the environment.

Another method calibrates a network of non-overlapping cameras, Ali Rahimi, Brian Dunagan, and Trevor Darrell, "Simultaneous calibration and tracking with a network of non-overlapping sensors," IEEE Vision and Pattern Recognition, pages 187-194, June 2004. However, that method requires the tracking of a moving object.

It is desired to use complex PTZ cameras that are responsive to events detected by simple sensors, such as motion sensors. Specifically, it is desired to observe the events with the PTZ cameras without specialized tracking sensors. Moreover, it is desired to track and detect events generated by multiple users.

SUMMARY OF THE INVENTION

The invention provides a context aware surveillance system for an environment, such as a building. It is impractical to cover an entire building with cameras, and it is not feasible to predict and specify all the interesting events that can occur in an arbitrary environment.

Therefore, the invention uses a hybrid sensor network that automatically determines a policy to efficiently use a limited resource, such as pan-tilt-zoom (PTZ) camera.

This invention improves over prior art systems by adopting a functional definition of calibration. The invention recovers a description of a relationship between a camera, and sensors arranged in the environment that can be used to make the best use of the PTZ camera.

A conventional technique first requires a geometric survey to determine a map of the environment. Then, moving objects in the environment can be tracked according to the map.

In contrast to this marginal solution, the invention provides a joint solution that directly estimates the objective: a policy that automatically enables the PTZ camera to acquire a video of interesting events, without having to perform a geometric survey.

DETAILED DESCRIPTION OF THE PREFERRED EMBODIMENT

Figure 1:
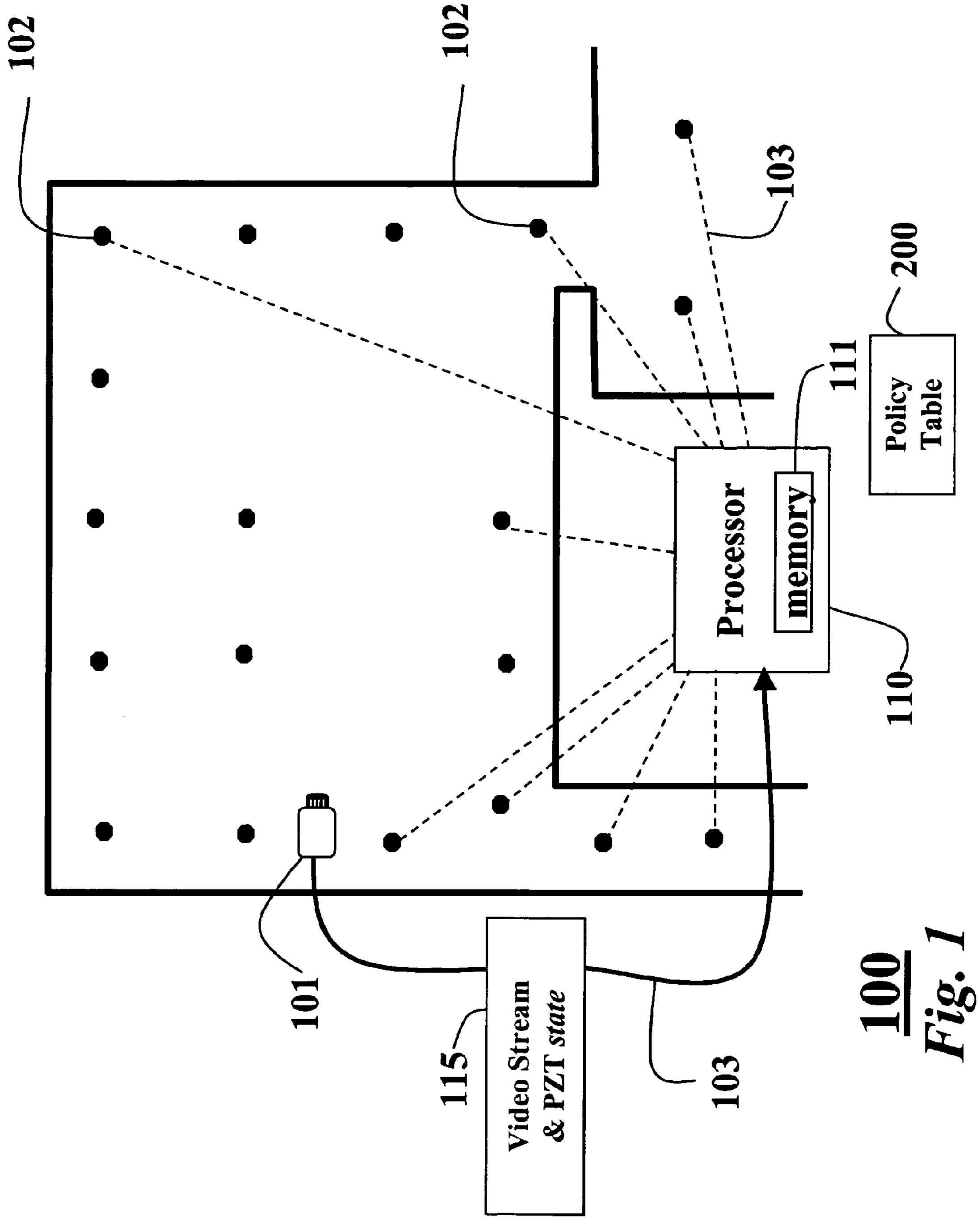
FIG. 1 is a schematic of an environment including a hybrid sensor network according to the invention.

FIG. 1 shows a surveillance system 100 according to the invention. The system uses a hybrid network of sensors in an environment, e.g., a building. The network includes a complex, expensive sensor 101, such as a pan-tilt-zoom (PTZ) camera, and a large number of simple, cheap context sensors 102, e.g., motion detectors, break-beam sensors, Doppler ultrasound sensors, and other low-bit-rate sensors. The sensors 101-102 are connected to a processor 110 by, for example, channels 103. The processor includes a memory 111.

Our invention employs action selection. The context sensors 102 detect events. That is, the sensors generate a random process that is binary valued, at each instant of time. The process is either true, if there is motion present in the environment, or false, if there is no motion.

A video stream 115 from the PTZ camera 101 can similarly be reduced to a binary process using well-known techniques, Christopher Wren, Ali Azarbayejani, Trevor Darrell, and Alex Pentland, "Pfinder: Real-time tracking of the human body," IEEE Trans. Pattern Analysis and Machine Intelligence, 19(7), pp. 780-785, July 1997; Chris Stauffer and W. E. L. Grimson. "Adaptive background mixture models for real-time tracking," Computer Vision and Pattern Recognition, volume 2, June 1999; Kentaro Toyama, John Krumm, Barry Brumitt, and Brian Meyers, "Wallflower: Principles and Practice of Background Maintenance," IEEE International Conference on Computer Vision, 1999.

This process yields another binary process that indicates when there is motion in the view of the PTZ camera 101. The video stream 115 is further encoded with a current state of the PTZ camera, i.e., output pan, tilt, and zoom parameters of the camera when the motion is detected.

The system recovers the actions for the PTZ cameras 101. Each action is in the form of output parameters that cause the camera 101 to pan, tilt, and zoom to a particular pose. By pose, we mean translation and rotation for a total of six degrees of freedom. The events and actions are maintained in a policy table 200 stored in a memory 111 of the processor 110. The actions cause the PTZ cameras to view the events detected by the context sensors.

Figure 2:
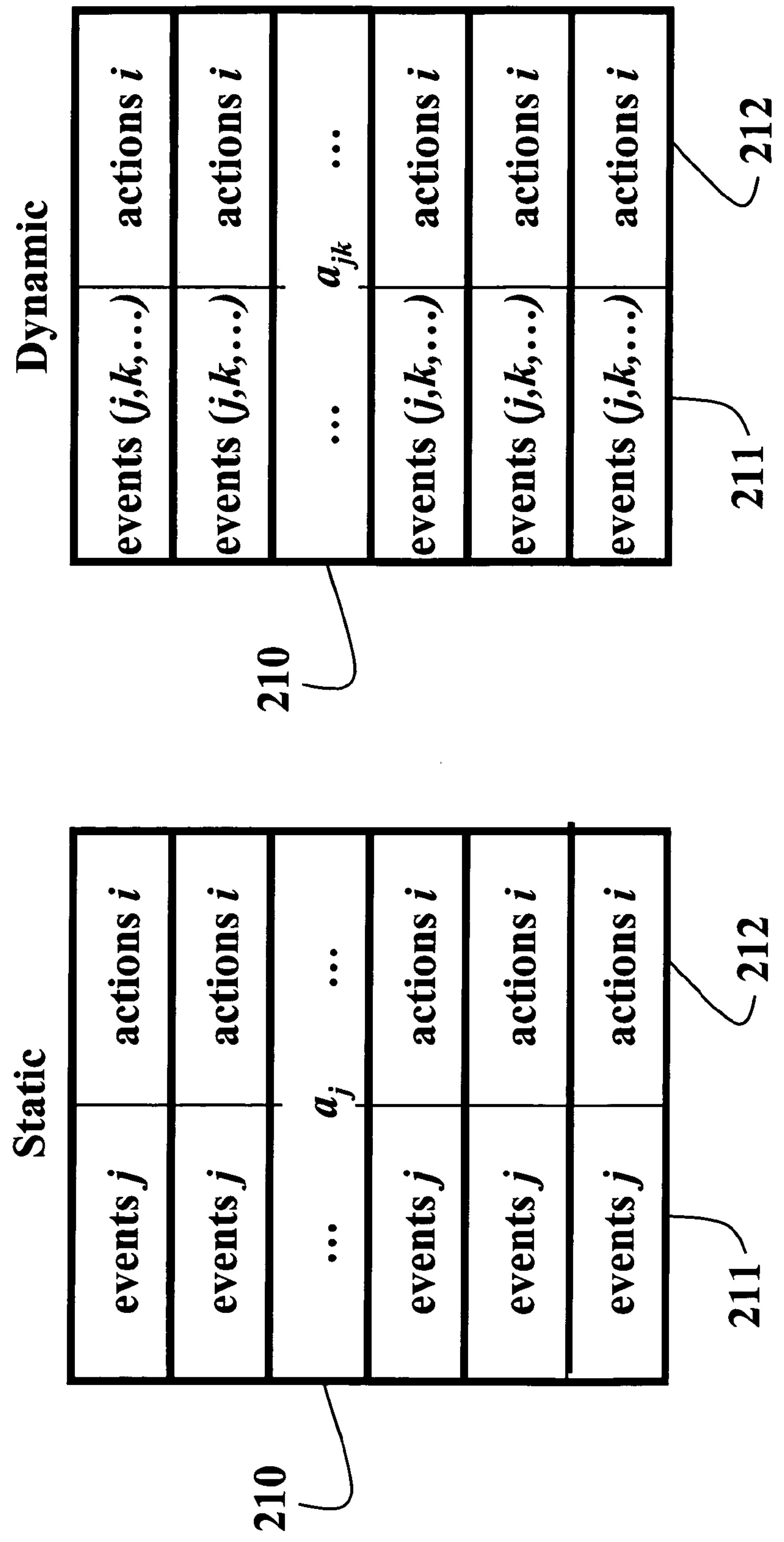
FIG. 2 is a table of events and actions according to the invention.

As shown in FIG. 2, each entry $a_j$ 210 in the table 200 maps an event, or a sequence of events, e.g., $j \in J$, $k \in K$ 211, to an action ($i \in I$) 212. The events and actions can be manually assigned. To select a particular entry $a_j$ 210 in the policy table $A_s$ 200, we determine the action 212 that causes the PTZ camera 101 to view the event that is detected by a particular context sensor 102.

Manual assignment of the actions to the events is very labor intensive as the number of entries in the table grows at least linearly in the number of sensors in the network. For a building-sized network, that is already a prohibitively large number.

However, system performance is improved by considering events as sequences, e.g., an event detected first by sensor 1 followed by sensor 2 can map to a different action than an event detected by sensor 3 followed by sensor 2.

When considering these pairs, the number of entries goes up quadratically, or worse, in the number of sensors, and thus quickly becomes impossible to specify by hand.

Therefore, we provide a learning method that allows the system to learn the policy table autonomously. In the single-sensor case, an entry is selected according to:

$$a_j = \underset{i \in I}{\operatorname{argmax}} \frac{R_{pc}(p_i[t], c_j[t])}{R_{pp}(p_i[t])}, \tag{1}$$

where $p_i[t]$ is a sequence of events generated by the PTZ camera in a pose corresponding to i, $c_j[t]$ is a sequence of events generated by a context sensor j, $R_{pc}$ is a correlation between the two event sequences $p_i[t]$ and $c_j[t]$, and $R_{pp}$ is an auto-correlation of the PTZ event sequence $p_i[t]$.

Without loss of generality, the events from both the context sensors 102 and a particular PTZ camera 101 can be modeled as a binary process. In this case Equation (1) above becomes:

$$a_j = \underset{i \in I}{\operatorname{argmax}} \frac{\|p_i[t] \wedge c_j[t]\|}{\|p_i[t]\|}, \tag{2}$$

where the ||.|| operator represents the number of true events in the binary process, and (.^.) is the Boolean intersection operator. This selection is based on how events coincide at a given instant in time. We call this selection process 'static'.

Another selection policy captures dynamic relationships in the sensed data by considering ordered pairs of context events. Here, an entry $a_{jk}$ is selected based on a sequence of events, i.e., an event detected by sensor k followed by an event detected by sensor j. Here, the selection process is given a particular time delay Δt, and models the dynamic relationships between event sequences, delayed in time. Therefore, we augment Equation (2) to include this particular constraint:

$$a_{jk} = \underset{i \in I}{\operatorname{argmax}} \frac{\|p_i[t] \wedge c_j[t] \wedge c_k[t - \Delta t]\|}{\|p_i[t]\|}. \tag{3}$$

This selection process rejects any entries that do not agree with the delay Δt. We call this selection 'dynamic'.

To allow a greater variability in the motion of users of the environment, we extend Equation (3) to consider a broader set of examples:

$$a_{jk} = \underset{i \in I}{\operatorname{argmax}} \frac{\left\| p_i[t] \wedge c_j[t] \wedge \bigcup_{\delta=0}^{\Delta t} c_k[t - \delta] \right\|}{\|p_i[t]\|}, \tag{4}$$

where the operator ∪ is the union over the sensed events. We use the union operator to allow the action selection to consider any event from sensor k, so long as the event occurred within a set time period δ preceding a second event. This flexibility both improves the speed of the learning, by making more data available to every element in the table, and also reduces the sensitivity to the a priori parameter Δt.

Because the time period extends down to Δt=0, concurrent events can be considered. This enables the selection process to correctly construct an embedded static entry $a_{jj}$. That is, this selection criteria is strictly more capable than the 'static' policy learner described above, while the 'dynamic' learner learns dynamic events, while ignoring all the 'static' events. We call this selection process 'lenient'.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

The invention claimed is:

1. A surveillance system for detecting events in an environment, comprising:

a camera arranged in an environment;

a plurality of context sensors arranged in the environment and configured to detect events in the environment; and a processor coupled to the camera and the plurality of context sensors via a network, the processor further comprising:

means for providing the camera with actions based only on the events detected by the context sensors, the actions causing the camera to view the detected events;

a memory storing the events and actions, in which the events and actions are stored in a table of the memory, and an entry $a_j$ in the table maps an event to an action;

means for selecting the entry $a_j$ according to:

$$a_j = \underset{i \in I}{\operatorname{argmax}} \frac{R_{pc}(p_i[t], c_j[t])}{R_{pp}(p_i[t])},$$

where $p_i[t]$ is a sequence of events generated by the camera in a particular pose corresponding to i, $c_j[t]$ is a sequence of events generated by a particular context sensor j, $R_{pc}$ is a correlation between the two event sequences $p_i[t]$ and $c_j[t]$, $R_{pp}$ is an auto-correlation of the event sequence $p_i[t]$, and t is an instant in time at which a particular event is detected.

2. The system of claim 1, in which the context sensors are motion detectors.

3. The system of claim 1, in which the context sensors produce a sequence of binary values, the binary values being true when there is motion in the environment, and the binary values being false when there is no motion.

4. The system of claim 1, further comprising:

means for acquiring a video stream with the camera; and means for encoding the video stream with poses of the camera.

5. The system of claim 4, in which a current pose encodes output pan, tilt, and zoom parameters from the camera when the motion is detected.

6. The system of claim 1, in which the actions include input pan, tilt, and zoom parameters for the camera to view the detected events.

7. The system of claim 1, in which the events and actions are stored in a table of the memory, and a selected entry $a_{jk}$ in the table maps a sequence of events to an action.

8. The system of claim 1, further comprising:

means for selecting the entry $a_j$ according to:

$$a_j = \underset{i \in I}{\operatorname{argmax}} \frac{\|p_i[t] \wedge c_j[t]\|}{\|p_i[t]\|},$$

where $p_i[t]$ is a sequence of events generated by the camera in a particular pose corresponding to i, $c_j[t]$ is a sequence of events generated by a particular context sensor j, the ||.|| operator represents events in binary process, and ^ is a Boolean intersection operator, to select the action based on how events coincide at a given instant in time.

9. The system of claim 7, further comprising:

means for selecting the entry $a_{jk}$ according to:

$$a_{jk} = \underset{i \in I}{\operatorname{argmax}} \frac{\|p_i[t] \wedge c_j[t] \wedge c_k[t - \Delta t]\|}{\|p_i[t]\|},$$

where $p_i[t]$ is a sequence of events generated by the camera in a particular pose corresponding to i, $c_j[t]$ is a sequence of events generated by a first context sensor j, $c_k[t]$ is a sequence of following events generated by a second context sensor k, the ||.|| operator represents events in binary process, ^ is a Boolean intersection operator, t is an instant in time, and Δt is a particular time delay between detecting events with the first and second sensors, to model a dynamic relationships between the event sequences, delayed in time.

10. The system of claim 7, further comprising:

means for selecting the entry $a_{jk}$ according to:

$$a_{jk} = \underset{i \in I}{\operatorname{argmax}} \frac{\left\| p_i[t] \wedge c_j[t] \wedge \bigcup_{\delta=0}^{\Delta t} c_k[t - \delta] \right\|}{\|p_i[t]\|},$$

where $p_i[t]$ is a sequence of events generated by the camera in a particular pose corresponding to i, $c_j[t]$ is a sequence of events generated by a first context sensor j, $c_k[t]$ is a sequence of following events generated by a second context sensor k, the ||.|| operator represents events in binary process, ^ is a Boolean intersection operator, t is an instant in time, Δt is a particular time delay, the operator ∪ is the union over the detected events, and δ is a predetermined time period between a first event and a second event.

* * * * *